United States Patent
Zhao et al.

(10) Patent No.: US 7,917,898 B2
(45) Date of Patent: Mar. 29, 2011

(54) METHODS AND APPARATUS TO PROVIDE A MODULAR NATIVE METHOD INVOCATION SYSTEM

(75) Inventors: Hai Zhao, Beijing (CN); Highland Mary Mountain, Gilbert, AZ (US); Kirk Dunsavage, Gilbert, AZ (US); Guangyu Zhu, Beijing (CN)

(73) Assignee: Intel Corporation, Santa Clara, CA (US)

( * ) Notice: Subject to any disclaimer, the term of this patent is extended or adjusted under 35 U.S.C. 154(b) by 1071 days.

(21) Appl. No.: 10/770,212

(22) Filed: Feb. 2, 2004

(65) Prior Publication Data

US 2005/0172299 A1    Aug. 4, 2005

(51) Int. Cl.
*G06F 9/45* (2006.01)
*G06F 3/00* (2006.01)

(52) U.S. Cl. .................. 717/136; 717/148; 719/313
(58) Field of Classification Search .................. None
See application file for complete search history.

(56) References Cited

U.S. PATENT DOCUMENTS

| | | | | |
|---|---|---|---|---|
| 5,659,751 A | * | 8/1997 | Heninger | 719/332 |
| 5,734,904 A | * | 3/1998 | Kanamori et al. | 719/331 |
| 5,842,017 A | * | 11/1998 | Hookway et al. | 717/158 |
| 5,875,335 A | * | 2/1999 | Beard | 717/139 |
| 6,066,181 A | * | 5/2000 | DeMaster | 717/148 |
| 6,067,577 A | * | 5/2000 | Beard | 719/331 |
| 6,074,432 A | * | 6/2000 | Guccione | 717/108 |
| 6,167,565 A | | 12/2000 | Kanamori | |
| 6,282,702 B1 | * | 8/2001 | Ungar | 717/148 |
| 6,314,429 B1 | * | 11/2001 | Simser | 717/163 |
| 6,484,188 B1 | | 11/2002 | Kwong et al. | |
| 6,691,302 B1 | * | 2/2004 | Skrzynski et al. | 717/118 |
| 7,340,730 B2 | * | 3/2008 | Arkwright et al. | 717/148 |
| 2001/0016881 A1 | * | 8/2001 | Sanchez et al. | 709/328 |
| 2002/0065943 A1 | * | 5/2002 | Czajkowski et al. | 709/310 |
| 2003/0177480 A1 | * | 9/2003 | Arkwright et al. | 717/148 |
| 2004/0103114 A1 | * | 5/2004 | Sesma | 707/103 R |
| 2005/0114848 A1 | * | 5/2005 | Choi et al. | 717/148 |

FOREIGN PATENT DOCUMENTS

EP    1046984 A2    10/2000

OTHER PUBLICATIONS

Gamma E. et al., "Design Patterns: Elements of Reusable Object-Oriented Software", Design Patterns. Elements of Reusable Object-Oriented Software, 1995, XP-002262137, pp. 139-161.

(Continued)

*Primary Examiner* — Michael J Yigdall
*Assistant Examiner* — Evral Bodden
(74) *Attorney, Agent, or Firm* — Hanley, Flight & Zimmerman, LLC (57) ABSTRACT

Methods and apparatus to provide a modular native method invocation (NMI) system are described herein. In an example method, first NMI information associated with a first NMI call from a first virtual machine is received and second NMI information associated with a second NMI call from a second virtual machine different from the first virtual machine is received. The first NMI information and the second NMI information is translated via an NMI adapter. To generate a native stub, the translated NMI information is provided to a modular NMI component.

27 Claims, 4 Drawing Sheets

OTHER PUBLICATIONS

Ciemiak M. et al., "The Open Runtime Platform: A Flexible High-Performance Managed Runtime Environment", Intel Technology Journal, Intel Corporation USA, No. 1, 2003, XP002376346, ISSN: 1535-864X, pp. 5-18.

Keserovic S., et al., "An Overview of Managed/Unmanaged Code Interoperability", MSDN Library, [Online], Oct. 2003, XP002376293, Retrieved from the Internet: URL: http://msdn.microsoft.com/library/default.asp?url=/library/en-us/dndotnet/html/manunmancode.asp>[retrieved on Apr. 6, 2006], pp. 1-8.

Submitted herewith is the International Search Report for International application No. PCT/US2005/001274 dated Jan. 6, 2006.

Submitted herewith is the Written Opinion of the International Searching Authority for International application No. PCT/US2005/001274 dated Jan. 6, 2006.

Submitted herewith is the International Preliminary Report on Patentability for International application No. PCT/US2005/001274 dated Aug. 17, 2006.

Summons to attend oral proceedings pursuant to Rule 115(1) EPC, issued by the European Patent Office in connection with European Patent No. 05705730.9, dated May 19, 2009, 7 pages.

* cited by examiner (PRIOR ART)

METHODS AND APPARATUS TO PROVIDE A MODULAR NATIVE METHOD INVOCATION SYSTEM

TECHNICAL FIELD

The present disclosure relates generally to managed runtime environments, and more particularly, to methods and apparatus to provide a modular native method invocation system.

BACKGROUND

As applications migrate toward managed runtime environments (MRTEs) such as Java® Virtual Machine (JVM) and Common Language Runtime (CLR) provided by Microsoft® .NET, unmanaged application components may need to be integrated into or coexist with new MRTE-based systems. In particular, managed code is code executing under the control of an MRTE (e.g., any code written in C# or Visual Basic .NET) whereas unmanaged code is code executing outside of the MRTE (e.g., COM components and WIN32 application program interface (API) functions). However, low-level platform components and legacy application components may not be compatible with the new MRTE-based systems. That is, some legacy application components are kept outside of MRTEs (i.e., unmanaged code) because current MTREs cannot comprehend certain platform specific features of the legacy application components. Another reason for keeping some legacy application components outside of MRTEs is the high cost involved in converting the legacy application components to managed code.

Native method invocation (NMI) such as platform invoke is a service that enables managed code to call unmanaged functions implemented in dynamic link libraries (DLLs) such as Microsoft® WIN32 API. Typically, an NMI component is used during common language infrastructure (CLI) runtimes to improve performance of a processor system (i.e., a platform). In particular, the NMI component interacts with many different data structures of a virtual machine to process managed code and unmanaged code. Currently, however, there is no standard for implementation of the NMI component so that information associated with the NMI component may be customized for optimization from one virtual machine to another.

DETAILED DESCRIPTION

Although the following discloses example systems including, among other components, software or firmware executed on hardware, it should be noted that such systems are merely illustrative and should not be considered as limiting. For example, it is contemplated that any or all of the disclosed hardware, software, and/or firmware components could be embodied exclusively in hardware, exclusively in software, exclusively in firmware or in some combination of hardware, software, and/or firmware.

Figure 1:
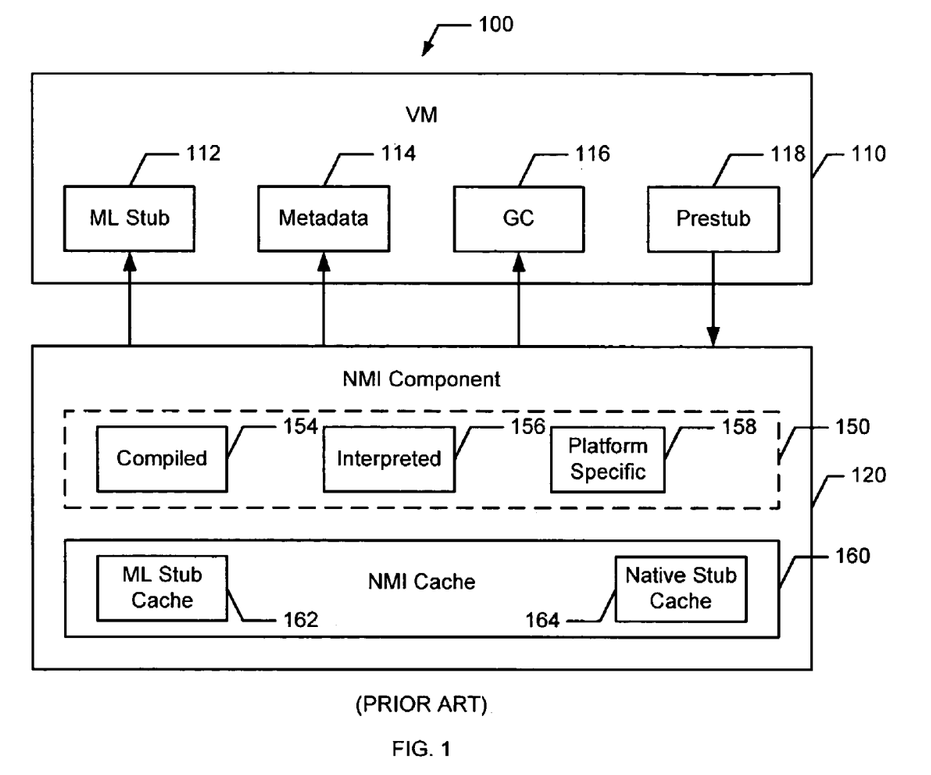
FIG. 1 is a block diagram representation of an example native method invocation (NMI) system configured in a known manner.

Referring to FIG. 1, an NMI system 100 configured in a known manner typically includes a virtual machine (VM) 110 and an NMI component 120. The VM 110 is an execution environment (i.e., runtime) that operates as an interface between a compiler and a processor in a processor system (e.g., the processor system 1000 of FIG. 6) such as Java® Virtual Machine (JVM) and/or Common Language Runtime (CLR) provided by Microsoft® .NET. In particular, the VM 110 includes a marshaling language (ML) stub 112, metadata 114, a garbage collector (GC) 116, and a prestub 118. As used herein "stub" refers to a portion of dynamically-generated code to perform various tasks during execution of a method. As used herein the term "method" refers to one or more applications, programs, functions, routines, or subroutines for manipulating data. The metadata 114 (i.e., NMI information) includes a native method signature, a method return type, and call site information such as a native library path and/or a native library name to generate the ML stub 112. Persons of ordinary skill in the art will readily recognize that the GC 116 recovers memory storage that is no longer used by a method so that the memory storage is available for other processes of that method and/or other methods. The prestub 118 includes code that indicates a NMI call of a method to an entry point during runtime. In general, the performance of a processor may be optimized if the processor operates in its native code because native code is code compiled to run with a particular processor. Accordingly, the prestub 118 calls into the NMI component 120 when a native method is invoked by the VM 110 to generate a native stub of the native method.

The NMI component 120 typically includes a plurality of NMI stubs 150 and an NMI cache 160. The plurality of NMI stubs 150 includes a compiled stub 154, an interpreted stub 156, and a platform specific stub 158 as described in detail below. The NMI cache 160 includes an ML stub cache 162 and a native stub cache 164. The ML stub cache 162 stores the ML stub 112 while the native stub cache 164 stores the native stub (not shown) generated based on the ML stub 112 to execute the native method.

Upon being called by the VM 110 via the prestub 118, the NMI component 120 generates the ML stub 112 to invoke the native method during runtime based on the metadata 114 of the VM 110. In particular, the NMI component 120 translates the ML stub 112 into native instructions as parts of the native stub (i.e., data marshaling). If the data marshaling is simple (e.g., only blittable type parameters exist), the ML stub 112 may be compiled to native instructions (i.e., the compiled stub 154). Alternatively, if the data marshaling is complex, the ML stub 112 may be interpreted at runtime (i.e., the interpreted stub 156). The GC 116 is disabled during execution of the native stub and is enabled after the execution of the native stub to ensure that parameters of the NMI method signature passed to the native method are not moved in memory (e.g., the main memory 1030 of FIG. 6). After the native stub is generated based on the ML stub 112, the native stub is stored in the native stub cache 164. As a result, the NMI component 120 may retrieve the native stub from the native stub cache 164 during subsequent calls of the method.

Figure 2:
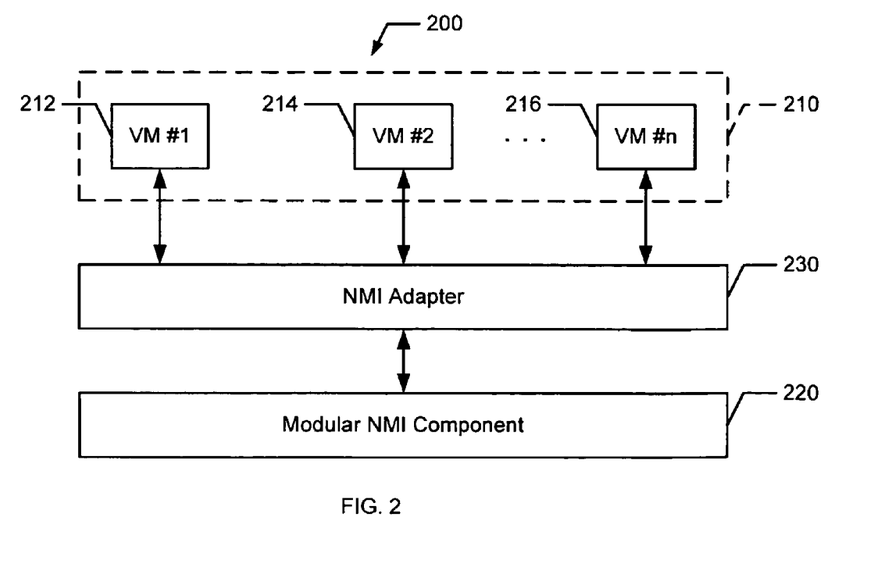
FIG. 2 is a block diagram representation of an example modular NMI system configured in accordance with the teachings of the invention as disclosed herein.

In the example of FIG. 2, the illustrated modular NMI system 200 includes one or more VMs 210 generally shown as VM #1 212, VM #2 214, and VM #n 216, a modular NMI component 220, and an NMI adapter 230. In general, the NMI adapter 230 operates as an interface between the VMs 210 and the modular NMI component 220 to solve any mismatch/compatibility problems so that the modular NMI component 220 may be plugged into any of the different VMs 210. In contrast to the VM 110 and the modular NMI component 120 interacting directly with each other as described in connection with FIG. 1, the VMs 210 and the modular NMI component 220 interact with the NMI adapter 230. The NMI adapter 230 acts as a wrapper between the VMs 210 and the modular NMI component 220.

In an example operation, the VM #1 212 may call the NMI adapter 230 to invoke the modular NMI component 220. The NMI adapter 230 translates NMI information received from VM #1 212 into the API of the modular NMI component 220. Further, the modular NMI component 220 may request the NMI adapter 230 to retrieve additional information from the VMs 210. The NMI adapter 230 separates the modular NMI component 220 from different VM implementations so that the modular NMI component 220 is independent of any particular VM (i.e., an independent NMI module). The data structure used in the different VMs 210 is irrelevant to the modular NMI component 220 because the modular NMI component 220 retrieves information from any of the different VMs 210 via the NMI adapter 230, which formats retrieved data in a manner known by the modular NMI component 220. That is, the NMI adapter 230 permits the modular NMI component 220 to be plugged into any of the different VMs 210. As a result, the modular NMI component 220 may operate in connection with VM #1 212, VM #2 214, VM #n 216 and/or any other suitable execution environments.

Figure 3:
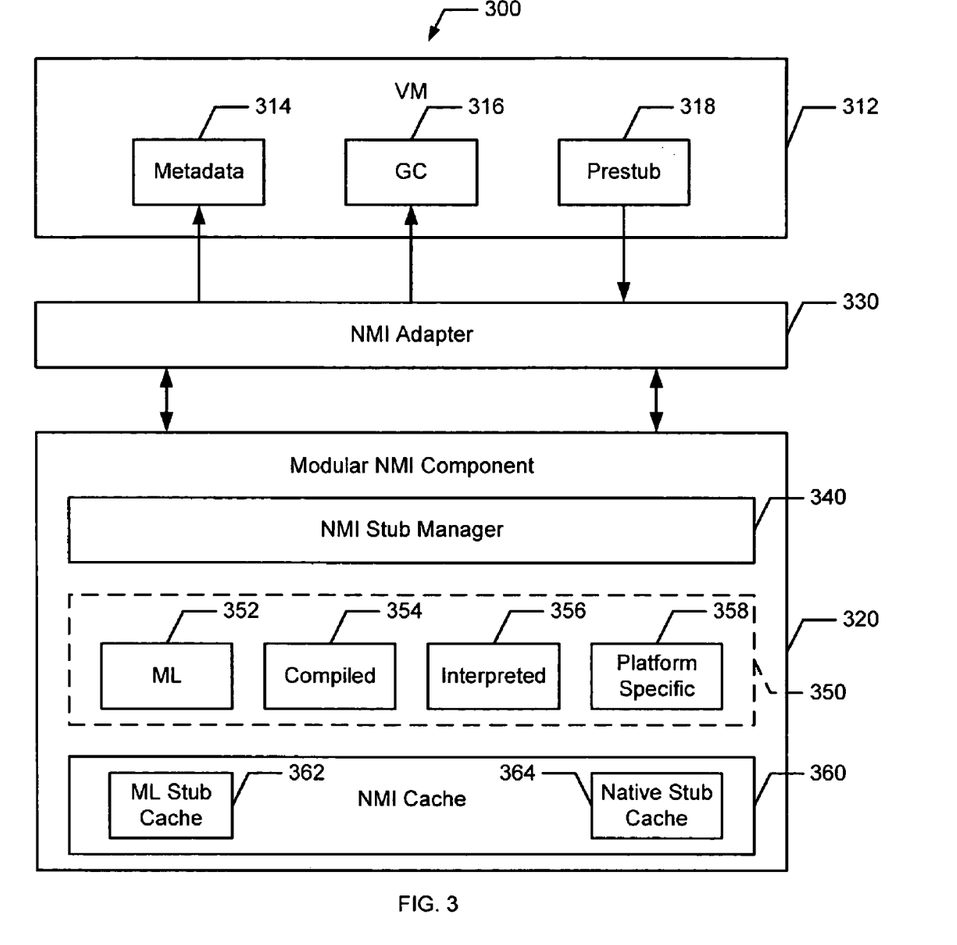
FIG. 3 is a block diagram representation showing additional detail of the example modular NMI system of FIG. 2.

In the example of FIG. 3, an illustrated VM 312 includes metadata 314, a GC 316, and a prestub 318. The modular NMI component 320 includes an NMI stub manager 340, a plurality of NMI stubs 350, and an NMI cache 360. The NMI stub manager 340 is the core component in the modular NMI component 320 because the NMI stub manager 340 processes NMI calls from the VM 312 via an NMI adapter 330. In particular, the NMI stub manager 340 receives a VM request to perform an NMI call from the NMI adapter 330, retrieves running background information from an application and a VM, and analyzes the VM request and the running background information to dynamically select a proper stub from the plurality of NMI stubs 350 (i.e., a compiled stub 354, an interpreted stub 356, and/or a platform specific stub 358) to process the NMI call. In contrast to the NMI component 120 described in connection with FIG. 1, the modular NMI component 320, rather than the VM 312, generates an ML stub 352 because the NMI adapter 330 permits the modular NMI component 320 to customize optimization with the VM 312. The modular NMI component 320 generates a native stub based on the ML stub 352 during runtime to execute a native method.

Figure 4:
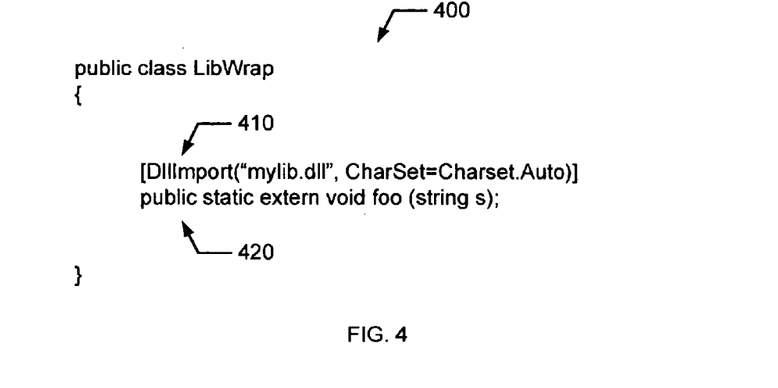
FIG. 4 is a code representation of example code associated with NMI that may be used to implement the example modular NMI system of FIG. 3.

In the example of FIG. 4, the illustrated code 400 includes a "DllImport" function 410 and an "extern" method declaration 420 to generate the ML stub 352 to execute the NMI call from the VM 312 by the modular NMI component 320. In particular, the modular NMI component 320 passes control to the "DllImport" function 410 to locate a native code library (e.g., a DLL) in "mylib.dll" and load the DLL into memory (e.g., the memory 1030 of FIG. 6). Further, the modular NMI component 320 locates the address of the native method in memory, and pushes arguments (e.g., integers, strings, arrays, structures, etc.) into a stack. The "extern" method declaration 420 indicates that the native method associated with NMI call (e.g., method "foo") is outside of the VM 310. As a result, the modular NMI component 320 may generate the ML stub 352 to generate the native stub prior to transferring controls to the native method.

Referring back to FIG. 3, the modular NMI component 320 implements the plurality of NMI stubs 350 to perform different optimization strategies. That is, each of the plurality of NMI stubs 350 corresponds to a particular optimization strategy. In particular, the compiled stub 354 parses and compiles the ML stub 352 to native instructions so that no runtime support functions in the ML stub 352. The compiled stub 354 may run faster than the interpreted stub 356 but may include restrictions for parameters being marshaled. The interpreted stub 356 parses and interprets the ML stub 352 when an NMI call is executing. The interpreted stub 356 includes many runtime support functions to perform stack manipulation and data marshaling. The platform specific stub 358 applies optimizations related to the specific platform. For example, Streaming SIMD Extension (SSE) and/or SSE2 instructions may be used to improve performance of a processor system implemented using one or more of the Intel® Pentium® technology, the Intel® Itanium® technology, and/or Intel® Personal Internet Client Architecture (PCA) technology.

Figure 5:
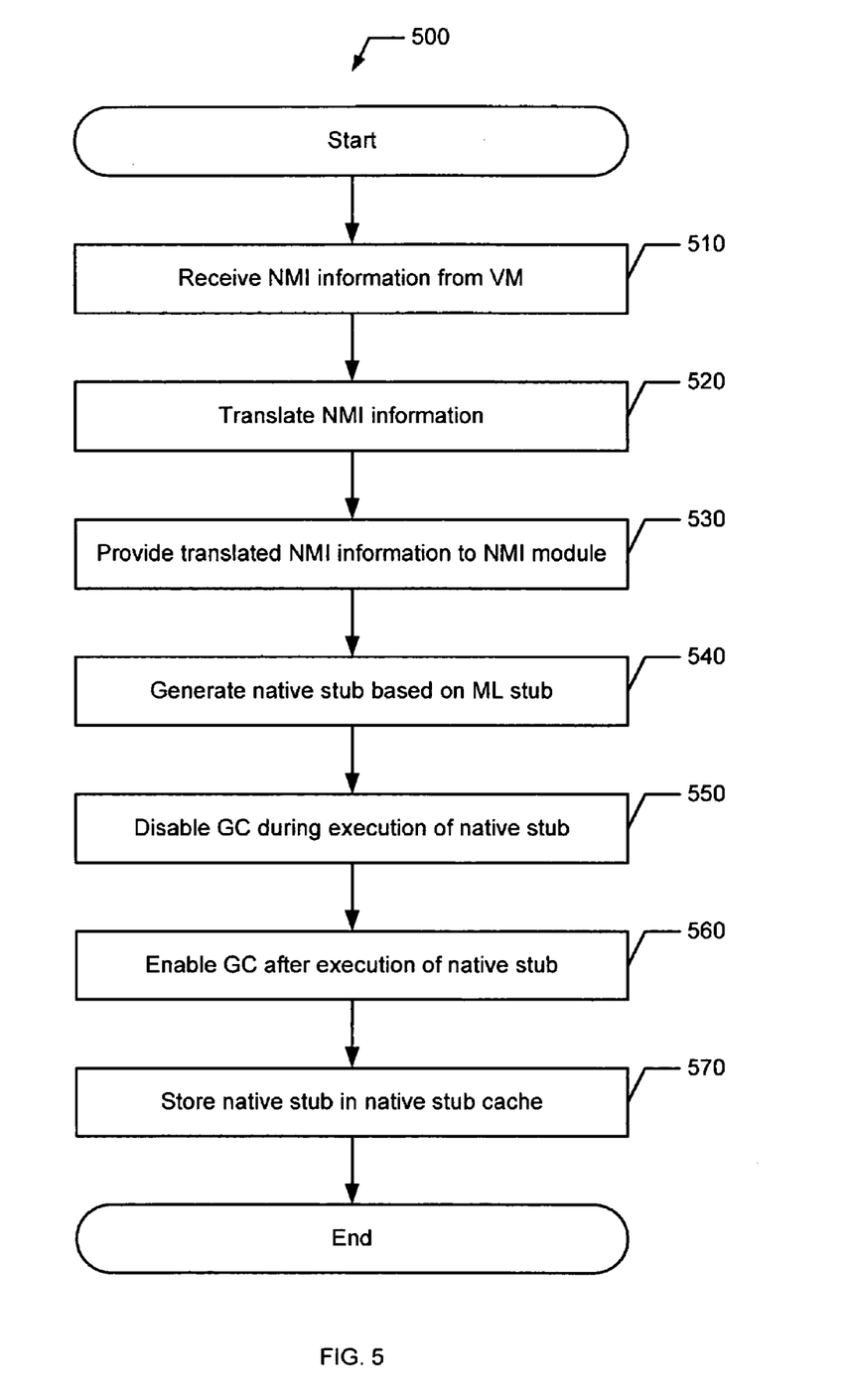
FIG. 5 is a flow diagram representation of example machine readable instructions that may be executed to implement the example modular NMI system shown of FIG. 3.

A flow diagram 500 representing machine readable instructions that may be executed by a processor to provide a modular NMI system is illustrated in FIG. 5. Persons of ordinary skill in the art will appreciate that the instructions may be implemented in any of many different ways utilizing any of many different programming codes stored on any of many computer-readable mediums such as a volatile or non-volatile memory or other mass storage device (e.g., a floppy disk, a CD, and a DVD). For example, the machine readable instructions may be embodied in a machine-readable medium such as an erasable programmable read only memory (EPROM), a read only memory (ROM), a random access memory (RAM), a magnetic media, an optical media, and/or any other suitable type of medium. Alternatively, the machine readable instructions may be embodied in a programmable gate array and/or an application specific integrated circuit (ASIC). Further, although a particular order of actions is illustrated in FIG. 5, persons of ordinary skill in the art will appreciate that these actions can be performed in other temporal sequences. Again, the flow diagram 500 is merely provided and described in conjunction with the example modular NMI system of FIG. 3 as an example of one way to provide a modular NMI system.

In the example of FIG. 5, the flow diagram 500 begins with the NMI adapter 330 receiving NMI information associated with the NMI call initiated by the VM 312 (block 510). For example, the NMI information may include a native method signature, a method return type, a native library path, and a native library name. Accordingly, the NMI adapter 330 translates the NMI information for the modular NMI component 320 (block 520). The NMI adapter 330 forwards the translated NMI information to the NMI component 320 to generate the ML stub 352 (i.e., data marshaling) (block 530). Based on the ML stub 352, the modular NMI component 320 generates the native stub associated with the NMI call (block 540). During execution of the native stub, the NMI adapter 330 disables the GC 316 (block 550). As noted above, the NMI adapter 330 disables to the GC 316 so that parameters of the NMI method signature passed to the native method are not moved in memory. After execution of the native stub, the NMI adapter 330 enables the GC 316 again so that the GC 316 may offers its services (block 560). Further, the modular NMI component 320 stores the native stub in the native stub cache 364 (block 570). As a result, the modular NMI component 320 and the NMI adapter 330 provide customized optimization in different execution environments.

The methods and apparatus disclosed herein are well suited for source code implemented using the European Computer Manufacturers Association (ECMA) Common Language Infrastructure (CLI) (second edition, December 2002) and the ECMA C# language specification (second edition, December 2002). However, persons of ordinary skill in the art will appreciate that the teachings of the disclosure may be applied to source code in other standards or specifications.

Figure 6:
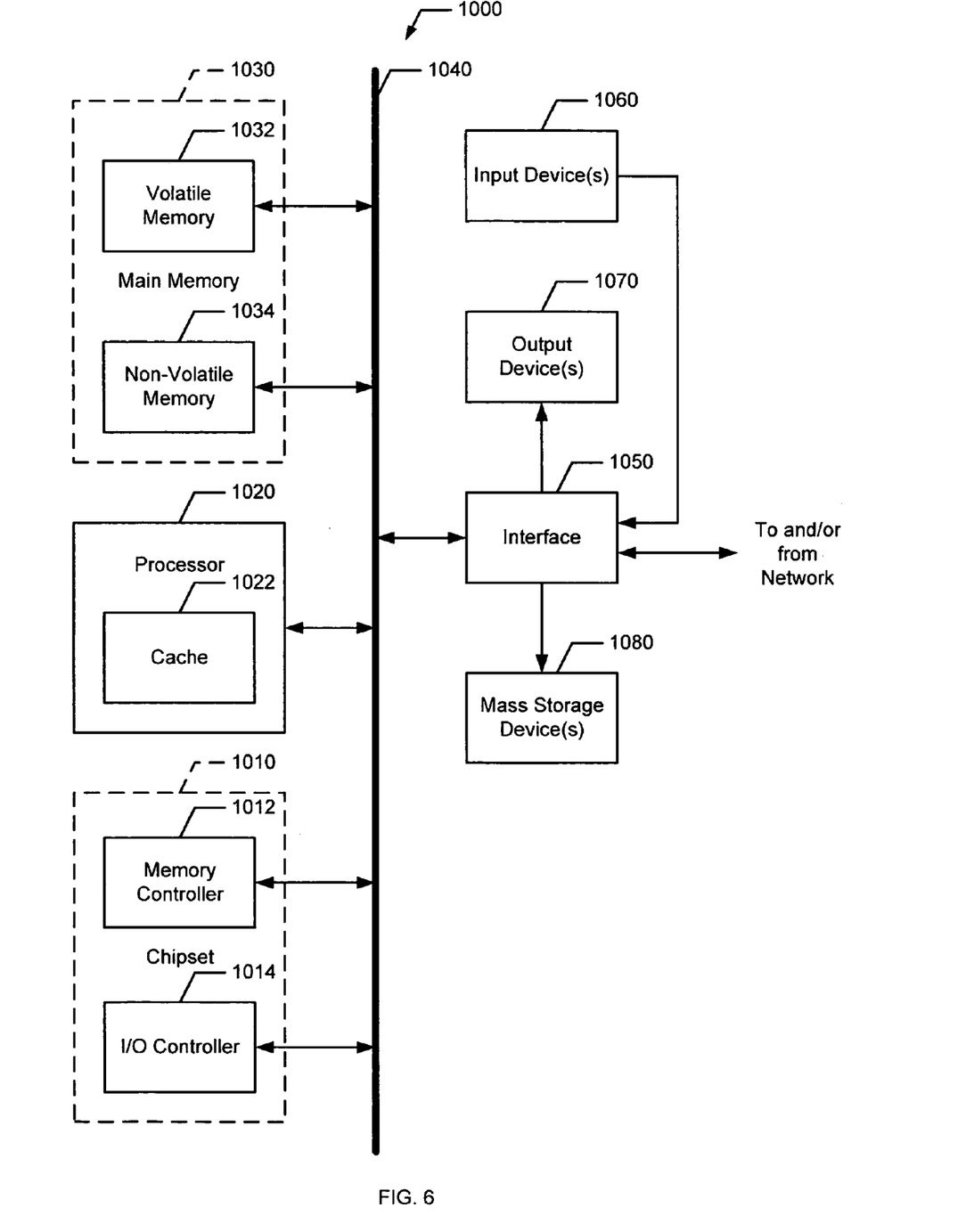
FIG. 6 is a block diagram representation of an example processor system that may be used to implement the example modular NMI system of FIG. 3.

FIG. 6 is a block diagram of an example processor system 1000 adapted to implement the methods and apparatus disclosed herein. The processor system 1000 may be a desktop computer, a laptop computer, a notebook computer, a personal digital assistant (PDA), a server, an Internet appliance or any other type of computing device.

The processor system 1000 illustrated in FIG. 6 includes a chipset 1010, which includes a memory controller 1012 and an input/output (I/O) controller 1014. As is well known, a chipset typically provides memory and I/O management functions, as well as a plurality of general purpose and/or special purpose registers, timers, etc. that are accessible or used by a processor 1020. The processor 1020 is implemented using one or more processors. For example, the processor 1020 may be implemented using one or more of the Intel® Pentium® technology, the Intel® Itanium® technology, Intel® Centrino™ technology, and/or the Intel® XScale® technology. In the alternative, other processing technology may be used to implement the processor 1020. The processor 1020 includes a cache 1022, which may be implemented using a first-level unified cache (L1), a second-level unified cache (L2), a third-level unified cache (L3), and/or any other suitable structures to store data as persons of ordinary skill in the art will readily recognize.

As is conventional, the memory controller 1012 performs functions that enable the processor 1020 to access and communicate with a main memory 1030 including a volatile memory 1032 and a non-volatile memory 1034 via a bus 1040. The volatile memory 1032 may be implemented by Synchronous Dynamic Random Access Memory (SDRAM), Dynamic Random Access Memory (DRAM), RAMBUS Dynamic Random Access Memory (RDRAM), and/or any other type of random access memory device. The non-volatile memory 1034 may be implemented using flash memory, Read Only Memory (ROM), Electrically Erasable Programmable Read Only Memory (EEPROM), and/or any other desired type of memory device.

The processor system 1000 also includes an interface circuit 1050 that is coupled to the bus 1040. The interface circuit 1050 may be implemented using any type of well known interface standard such as an Ethernet interface, a universal serial bus (USB), a third generation input/output interface (3GIO) interface, and/or any other suitable type of interface.

One or more input devices 1060 are connected to the interface circuit 1050. The input device(s) 1060 permit a user to enter data and commands into the processor 1020. For example, the input device(s) 1060 may be implemented by a keyboard, a mouse, a touch-sensitive display, a track pad, a track ball, an isopoint, and/or a voice recognition system.

One or more output devices 1070 are also connected to the interface circuit 1050. For example, the output device(s) 1070 may be implemented by display devices (e.g., a light emitting display (LED), a liquid crystal display (LCD), a cathode ray tube (CRT) display, a printer and/or speakers). The interface circuit 1050, thus, typically includes, among other things, a graphics driver card.

The processor system 1000 also includes one or more mass storage devices 1080 to store software and data. Examples of such mass storage device(s) 1080 include floppy disks and drives, hard disk drives, compact disks and drives, and digital versatile disks (DVD) and drives.

The interface circuit 1050 also includes a communication device such as a modem or a network interface card to facilitate exchange of data with external computers via a network. The communication link between the processor system 1000 and the network may be any type of network connection such as an Ethernet connection, a digital subscriber line (DSL), a telephone line, a cellular telephone system, a coaxial cable, etc.

Access to the input device(s) 1060, the output device(s) 1070, the mass storage device(s) 1080 and/or the network is typically controlled by the I/O controller 1014 in a conventional manner. In particular, the I/O controller 1014 performs functions that enable the processor 1020 to communicate with the input device(s) 1060, the output device(s) 1070, the mass storage device(s) 1080 and/or the network via the bus 1040 and the interface circuit 1050.

While the components shown in FIG. 6 are depicted as separate blocks within the processor system 1000, the functions performed by some of these blocks may be integrated within a single semiconductor circuit or may be implemented using two or more separate integrated circuits. For example, although the memory controller 1012 and the I/O controller 1014 are depicted as separate blocks within the chipset 1010, persons of ordinary skill in the art will readily appreciate that the memory controller 1012 and the I/O controller 1014 may be integrated within a single semiconductor circuit.

Although certain example methods, apparatus, and articles of manufacture have been described herein, the scope of coverage of this patent is not limited thereto. On the contrary, this patent covers all methods, apparatus, and articles of manufacture fairly falling within the scope of the appended claims either literally or under the doctrine of equivalents.

What is claimed is:

1. A method comprising:
   receiving first native method invocation (NMI) information associated with a first NMI call from a first virtual machine at a runtime of the first virtual machine;
   receiving second NMI information associated with a second NMI call from a second virtual machine different from the first virtual machine at a runtime of the second virtual machine;
   translating the first NMI information and the second NMI information via an NMI adapter;
   providing one of the first translated NMI information or the second translated NMI information to a modular NMI component;
   generating a marshaling language stub based on the one of the first translated NMI information or the second translated NMI information;
   selecting, based on the marshaling language stub and at least one of the first virtual machine or the second virtual machine, one of a compiled stub, an interpreted stub, or a platform specific stub; and
   generating a native stub based on the marshaling language stub and the selected one of the compiled stub, the interpreted stub, or the platform specific stub.

2. A method as defined in claim 1, wherein receiving the first NMI information associated with the first NMI call from the first virtual machine comprises receiving information associated with a platform invoke function call from the first virtual machine.

3. A method as defined in claim 1, wherein receiving the first NMI information associated with the first NMI call from the first virtual machine comprises receiving one of a native method signature, a method return type, a native library path, and a native library name.

4. A method as defined in claim 1, wherein receiving the first NMI information associated with the first NMI call from the first virtual machine comprises receiving first NMI information associated with the first NMI call from a Java Virtual Machine and receiving second NMI information associated with the second NMI call from a Common Language Runtime.

5. A method as defined in claim 1, wherein providing the first translated NMI information to an NMI module comprises providing the first translated NMI information to a platform invoke module.

6. A method as defined in claim 1 further comprising generating a marshaling language stub based on the first translated NMI information via the NMI module and storing the marshaling language stub within the NMI module.

7. A machine accessible medium having instructions, which when executed, cause a machine to:
receive first native method invocation (NMI) information associated with a first NMI call from a first virtual machine at a runtime of the first virtual machine;
receive second NMI information associated with a second NMI call from a second virtual machine different from the first virtual machine at a runtime of the second virtual machine;
translate at least one of the first or second NMI information via an NMI adapter;
provide the first translated NMI information or the second translated NMI information to an NMI module; generate a marshaling language stub based on the one of the first translated NMI information or the second translated NMI information;
select, based on the marshaling language stub and at least one of the first virtual machine or the second virtual machine, one of a compiled stub, an interpreted stub, or a platform specific stub; and
generate a native stub based on the marshaling language stub and the selected one of the compiled stub, the interpreted stub, or the platform specific stub.

8. A machine accessible medium as defined in claim 7, wherein the instructions cause the machine to receive the first NMI information associated with the first NMI call from the first virtual machine by receiving information associated with a platform invoke function call from the first virtual machine.

9. A machine accessible medium as defined in claim 7, wherein the instructions cause the machine to receive the first NMI information associated with the first NMI call from the first virtual machine by receiving one of a native method signature, a method return type, a native library path, and a native library name.

10. A machine accessible medium as defined in claim 7, wherein the instructions cause the machine to receive the first NMI information associated with the first NMI call from the first virtual machine by receiving first NMI information associated with the first NMI call from a Java Virtual Machine and receiving second NMI information associated with the second NMI call from a Common Language Runtime.

11. A machine accessible medium as defined in claim 7, wherein the instructions cause the machine to provide the first translated NMI information to an NMI module by providing the first translated NMI information to a platform invoke module.

12. A machine accessible medium as defined in claim 7, wherein the instructions cause the machine to disable a garbage collector associated with the first virtual machine prior to executing the native stub, to execute the native stub, and to enable the garbage collector after executing the native stub.

13. A machine accessible medium as defined in claim 7, wherein the instructions cause the machine to generate a marshaling language stub based on the first translated NMI information via the NMI module and to store the marshaling language stub within the NMI module.

14. A machine accessible medium as defined in claim 7, wherein the machine accessible medium comprises one of a programmable gate array, application specific integrated circuit, erasable programmable read only memory, read only memory, random access memory, magnetic media, and optical media.

15. An apparatus comprising:
a first virtual machine to provide native method invocation (NMI) information associated with a first NMI call at a runtime of the first virtual machine;
a second virtual machine, different from the first virtual machine, to provide NMI information associated with a second NMI call at a runtime of the second virtual machine;
an NMI module to generate a marshaling language stub based on at least one of a first translated NMI information or a second translated NMI information, to select, based on the marshaling language stub and at least one of the first virtual machine or the second virtual machine, one of a compiled stub, an interpreted stub, or a platform specific stub, and to generate a native stub based on the marshaling language stub and the selected one of the compiled stub, the interpreted stub, or the platform specific stub;
an NMI adapter coupled to the first virtual machine, the second virtual machine, and the NMI adapter to receive at least one of the first or second NMI information, to translate at least one of the first NMI information to the first translated NMI information or second NMI information to the second translated NMI information, and to provide the one of the first translated NMI information or the second translated NMI information to the NMI module; and
a processor to implement at least one of the first virtual machine, the second virtual machine, the NMI adapter, or the NMI module.

16. An apparatus as defined in claim 15, wherein the NMI adapter is to disable a garbage collector associated with the first virtual machine prior to executing the native stub, to execute the native stub, and to enable the garbage collector after executing the native stub.

17. An apparatus as defined in claim 15, wherein the first virtual machine comprises one of a Java Virtual Machine and a Common Language Runtime.

18. An apparatus as defined in claim 15, wherein the NMI module comprises a platform invoke module.

19. An apparatus as defined in claim 15, wherein the NMI module generates a marshaling language stub based on the first translated NMI information via the NMI module and stores the marshaling language stub within the NMI module.

20. An apparatus as defined in claim 15, wherein the first NMI information comprises a native method signature, a method return type, a native library path, and a native library name.

21. A processor system comprising:

a dynamic random access memory (DRAM); and a processor coupled to the DRAM to identify first native method invocation (NMI) information associated with a first NMI call from a first virtual machine at a runtime of the first virtual machine, to identify second NMI information associated with a second NMI call from a second virtual machine at a runtime of the second virtual machine, to translate at least one of the first NMI information or the second NMI information via an NMI adapter, to provide the at least one of the first translated NMI information or the second translated NMI information to a modular NMI component, to generate a marshaling language stub based on the one of the first translated NMI information or the second translated NMI information, to select, based on the marshaling language stub and at least one of the first virtual machine or the second virtual machine, one of a compiled stub, an interpreted stub, or a platform specific stub, and to generate a native stub based on the marshaling language stub and the selected one of the compiled stub, the interpreted stub, or the platform specific stub.

22. A processor system as defined in claim 21, wherein the processor is to disable a garbage collector associated with the first virtual machine prior to executing the native stub, to execute the native stub, and to enable the garbage collector after executing the native stub.

23. A processor system as defined in claim 21, wherein the first virtual machine is a Java Virtual Machine and the second virtual machine is a Common Language Runtime.

24. A processor system as defined in claim 21, wherein the modular NMI component comprises a platform invoke module.

25. A processor system as defined in claim 21, wherein the processor generates a marshaling language stub based on the first translated NMI information via the NMI module and stores the marshaling language stub within the modular NMI component.

26. A processor system as defined in claim 21, wherein the first NMI information comprises a native method signature, a method return type, a native library path, and a native library name.

27. A method as defined in claim 1, further comprising disabling a garbage collector associated with the first virtual machine prior to executing the native stub, executing the native stub, and enabling the garbage collector after executing the native stub.

* * * * *